Oct. 29, 1963     J. H. LEVERENZ     3,108,421
DOUBLE SICKLE MOWER
Filed July 16, 1962     2 Sheets-Sheet 1
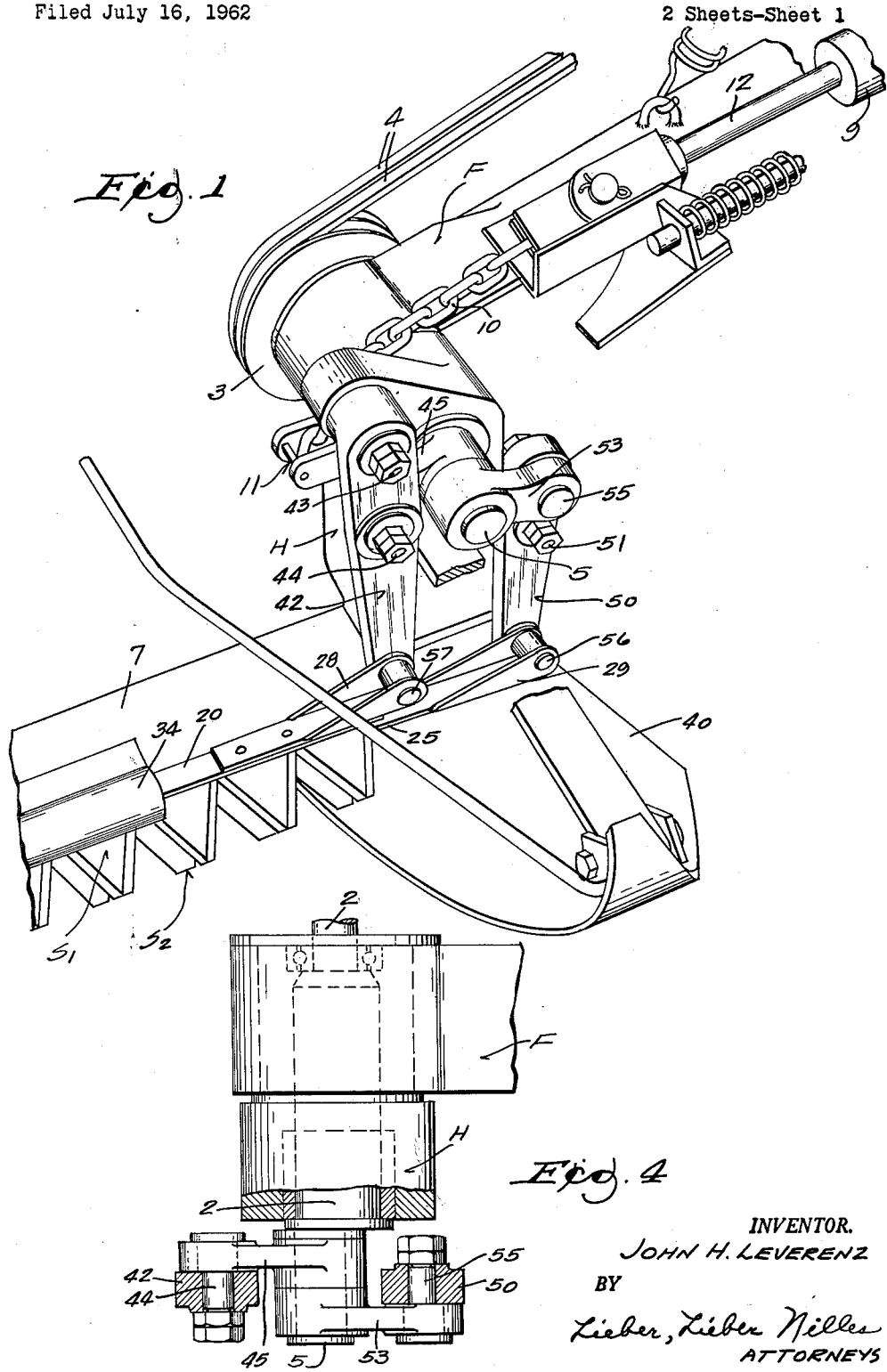
INVENTOR.
JOHN H. LEVERENZ
BY
Lieber, Lieber Nilles
ATTORNEYS Oct. 29, 1963

J. H. LEVERENZ 3,108,421

DOUBLE SICKLE MOWER

Filed July 16, 1962

INVENTOR.
JOHN H. LEVERENZ
BY
Lieben, Lieber & Nilles
ATTORNEYS

United States Patent Office 3,108,421
Patented Oct. 29, 1963

3,108,421
DOUBLE SICKLE MOWER
John H. Leverenz, West Bend, Wis., assignor to Gehl
Bros. Manufacturing Co., West Bend, Wis., a corporation of Wisconsin
Filed July 16, 1962, Ser. No. 210,044
3 Claims. (Cl. 56—297)

This invention relates generally to mowing machines of the double sickle type wherein a pair of oppositely reciprocating blades cooperate with each other to produce a cutting action on the crop.

Many prior art attempts have been made with various types of cranks, levers, and interconnecting links to produce a balanced and smoothly operating double sickle mower of this general character. Some examples are illustrated in the U.S. Patents No. 2,823,506, issued on February 18, 1958, to G. E. Irving or No. 2,664,690, issued on January 5, 1954, to E. F. Huddle et al. While having some degree of success from a commercially acceptable standpoint, prior devices have not proved to be entirely satisfactory; for example, plugging tends to be promoted by any hesitation of the blades at the point of their extreme travel. Other difficulties are high inertia problems primarily from an unbalance of forces, excessive friction and wear of the numerous parts, and generally an excessive number of parts to manufacture, adjust, service, and maintain in a properly balanced and aligned relationship.

Accordingly, the present invention provides an improved double sickle mower which has substantially eliminated or at least greatly reduced these problems. More specifically, a double sickle mower has been provided wherein the high inertia forces occur in each of the blade driving linkages at the same time and are substantially balanced out. Furthermore, the arrangement of the linkages is such that there is no hesitation at the end of either stroke, but cutting action occurs at all times. These desirable characteristics are accomplished with the use of only one eccentric and a minimum number of parts which in themselves are simple in design and produced economically. The action of the present mower is such that relatively longer strokes are possible at slower speeds of the blades.

These and other objects and advantages of the invention will be apparent from the following detailed description, reference being had to the accompanying drawings, in which:

FIGURE 1 is a perspective view of a portion of a mower embodying the invention, certain parts being shown as broken away or removed for clarity;

FIGURE 4 is a cross sectional view taken on line 4—4 of FIGURE 2.

Figure 3:
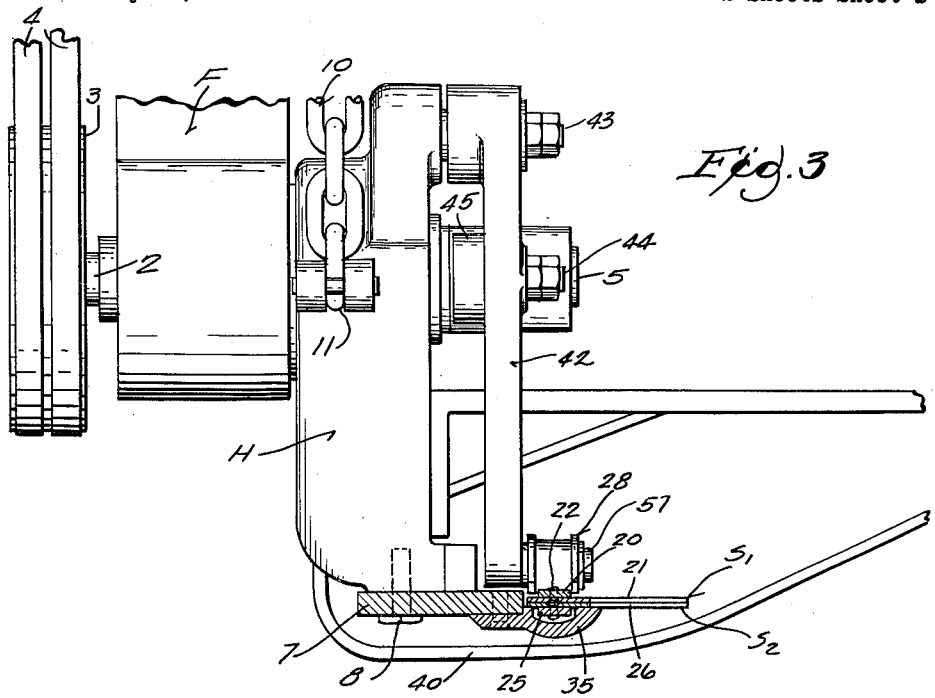
FIGURE 3 is a side elevational view of the device as shown in FIGURE 2.

Referring in greater detail to the drawings, a housing H is carried at the outer end of a frame F, which frame is vertically swingable in the conventional manner about its pivotal point of connection to a tractor (not shown) or other vehicle for being propelled over the ground.

A drive shaft 2 extends through the frame and housing and has drive pulleys 3 secured to its rear end and over which are trained the flexible belts 4 which in turn receive their power from a power take-off shaft (not shown) or the like which is carried by the vehicle. Mounted on the front end of the drive shaft is an eccentric or crank pin 5 which extends forwardly a short distance.

The housing H is swingably mounted on the drive shaft at the front side of the frame F and has laterally extending means for carrying attached sickle assemblies S1 and S2. This means comprises a main back-up bar 7 secured at its underside by cap bolts 8 which extend through the bar and into the mower housing.

The mower housing and its attached bar are swingable from the lower position shown in FIGURE 1 to a raised or substantially vertical position relative to the frame F by means of a double acting cylinder 9 which is connected to the mower housing by means of a flexible link 10 as at 11. The other end of the chain is secured to the free end of the piston 12 of the hydraulic cylinder. As these lifting devices are well known, it is believed sufficient to say that extension of the piston permits the mower to swing downwardly by gravity, while retraction of the piston causes swinging of the housing about the drive shaft and consequent raising of the mower mechanism by upward swinging of the free end thereof.

The pair of oppositely moving sickle bar assemblies S1 and S2 are mounted on the forward side of the main back-up bar 7, as previously indicated.

The upper sickle assembly includes a sickle bar 20 to which are attached the cutting sections 21 by means of rivets 22. The lower sickle assembly is comprised of a similar sickle bar 25 to which are riveted the various triangular shaped and double edged sections 26. The sickle bar assemblies S1 and S2 have attaching brackets 28, 29, respectively, secured at their inner ends and extending thereabove. These brackets each have a transverse bore 30, 31, respectively, extending therethrough and by means of which they are attached to the improved drive mechanism which will presently be described.

In regard to the sickle assemblies and the manner in which they are reciprocally mounted to the main back-up bar 7, this arrangement is more or less conventional, and it is believed sufficient to say that the oppositely facing clamps 34 and 35 which are secured to the main bar 7 embrace the assemblies which slide over one another and hold them closely together so that their oppositely moving and sharpened edges coact to sever the crop which enters between the knife sections. The sickle bars bear against the forward edge of the main bar 7 and rearward thrust on the knife sections is thus absorbed by this main back-up bar.

A conventional ground shoe 40 is secured under the inner end of the main bar and acts to support the mower mechanism for sliding movement over the ground.

The sickles travel at considerable speed, and the maximum inertia forces are encountered at the end of their stroke in either direction, and the present invention provides for substantially balancing out these oppositely directed inertia forces, one against the other.

In accordance with the present invention, the sickle assemblies are driven not only so that these maximum inertia forces are substantially balanced out, but also so there is no hesitation at the end of their stroke in either direction and continuous cutting action is accomplished.

Figure 2:
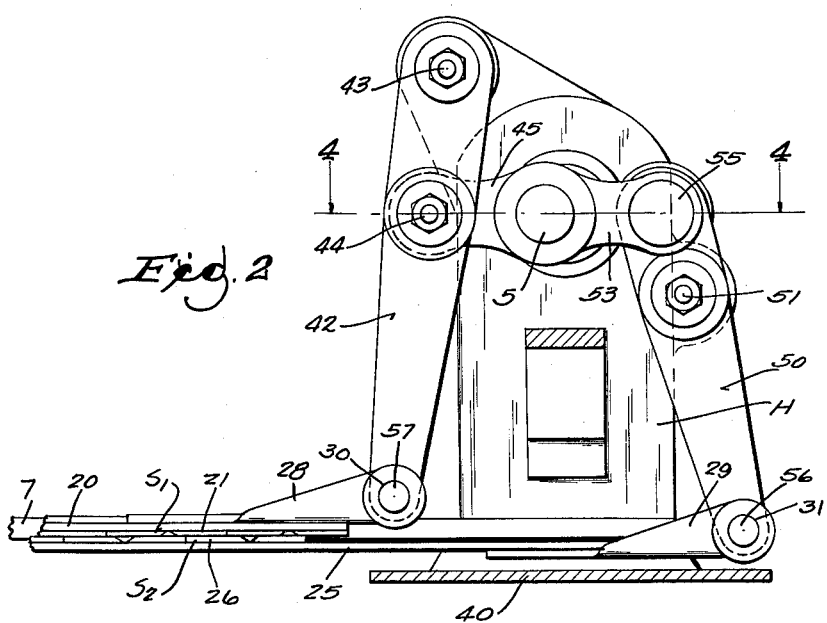
FIGURE 2 is a fragmentary front elevational view of the linkage mechanism shown in FIGURE 1, but on an enlarged scale, and certain parts being shown in section or broken away.

Referring to FIGURE 2, it will be noted that the linkage arrangement which drives the assembly S1 is a different linkage action from that which drives assembly S2. Nevertheless, the ratio of the moment arms of each of the driving levers for these assemblies is such that the same length of stroke or travel for each assembly is provided.

The sickle assemblies are each connected directly to the crank pins by identical connecting links, as will now be described.

In connection with the drive for assembly S1, a relatively long and generally vertical lever 42 is pivotally mounted at its upper end by means of the stub shaft 43 which is rigidly secured to the housing. A connecting link 45 is pivotally connected at one end intermediate the length of lever 42 and at the other end is mounted on the crank pin 5.

The ratio of the distance between the point of connection of the link to the longer lever to the lower and upper pivot connection of the latter is two to one.

In respect to the drive linkage for assembly S2, a shorter lever 50 is pivotally mounted intermediate its length to the stub shaft 51 which in turn is rigidly secured to the housing. Another connecting link 53, which is similar to link 45, is mounted at one end around the crank pin 5 and is pivotally connected at its other end at the upper end of lever 50 as by means of the shaft 55 which is secured to the upper end of the lever 50. Assembly S2 is pivotally attached by the pin 56 to the bracket 29 of the knife section, and the lower end of lever 42 is similarly pivotally attached by the pin 57 to the bracket 28 of assembly S1.

The ratio of the distance between the point of pivotal connection of the shorter link to the housing and to the lower and upper pivot connection at the ends of the lever is three to one.

It should be noted that the distance between pin 57 and shaft 44 as compared to the distance between shaft 44 and pin 43 is in the ratio of two to one. In regard to lever 50, the distance between the pivot point 51 and the lower pin 56 as compared to the distance between shaft 51 and the upper shaft 55 is in the ratio of three to one. However, even though the ratio of these moment arms for the two levers is different due to the fact that they embody different leverage principles, the stroke imparted at the lower end of the levers 42 and 50 and therefore their sickle assemblies is the same.

It will be noted that both of the generally vertical levers have a direct connection by means of their respective connecting links to the crank pin for being swung in a vertical plane. Additional links or connections are unnecessary, and consequently less wear or play between the parts can develop.

By being able to make the connecting links of equal length, economy of manufacture results and the number of parts necessary to stock is reduced. Also, the levers are of simple design, being straight and therefore relatively economical to manufacture. With the above-described arrangement, the assemblies reach the ends of their strokes at the same time, and no hesitation of either assembly occurs at either end of its stroke.

Various modes of carrying out the invention are contemplated as being within the scope of the following claims particularly pointing out and distinctly claiming the subject matter which is regarded as the invention.

I claim:

1. In a mowing machine, a support frame, a housing mounted on said frame, a pair of superposed sickle bars, each of said sickle bars having a plurality of cutting sections mounted side by side lengthwise of the bar, means connected to said housing for carrying said sickle bars, a drive shaft mounted in said housing, a single crank pin fixed to said drive shaft; a pair of straight levers mounted on said housing, one on either side of said drive shaft and for swinging in a vertical plane, one of said levers being longer than the other; the longer lever being pivotally mounted at its upper end to said housing and at its lower end to one of said sickle bars, a connecting link pivotally connected between said single crank pin and said longer lever intermediate the length of the latter, the shorter lever being mounted intermediate its length to said housing and at its lower end to the other of said sickle bars, and a second connecting link of the same length as said first link and pivotally connected to said single crank pin and to said shorter lever adjacent the upper end of the latter whereby rotation of said drive shaft causes reciprocation of said sickle bars in opposite directions but in equal strokes.

2. In a mowing machine, a support frame, a housing mounted on said frame, a pair of superposed sickle bars, each of said sickle bars having a plurality of cutting sections mounted side by side lengthwise of the bar, means connected to said housing for carrying said sickle bars, a drive shaft mounted in said housing about a generally horizontal axis and in a fore and aft direction in respect to mower travel, a single crank pin fixed to said drive shaft at the front end of the latter, a pair of straight levers mounted on said housing, one on either side of said drive shaft and for swinging in a vertical plane, one of said levers being longer than the other, the longer lever being pivotally mounted at its upper end to said housing and at its lower end to one of said sickle bars, a connecting link pivotally connected between said crank pin and said longer lever intermediate the length of the latter, the ratio of the distance between the point of connection of the link to the longer lever to the lower and upper pivot connections of the latter being two to one, the shorter lever being mounted intermediate its length to said housing and at its lower end to the other of said sickle bars, and a second connecting link of the same length as said first link and pivotally connected to said crank pin and to said shorter lever adjacent the upper end of the latter, the ratio of the distance between the point of pivotal connection of the shorter link to the housing and to the lower and upper pivot connection at the ends of said lever being three to one, whereby rotation of said drive shaft causes reciprocation of said sickle bars in opposite directions but in equal strokes.

3. A mowing machine comprising a housing, a pair of superposed sickle bars, means connected to said housing for carrying said sickle bars, a single eccentric drive shaft mounted in said housing, a pair of straight levers swingably mounted on said housing, one on either side of said drive shaft and one being longer than the other, the longer lever mounted at its upper end to said housing and at its lower end to one of said sickle bars, a connecting link between said drive shaft and said longer lever intermediate the length of the latter, the shorter lever being mounted intermediate its length to said housing and at its lower end to the other of said sickle bars, and a second connecting link between said drive shaft and the upper end of said shorter lever, whereby rotation of said drive shaft causes reciprocation of said sickle bars in opposite directions.

References Cited in the file of this patent

UNITED STATES PATENTS

| | | |
|---|---|---|
| 2,157,041 | Wagner | May 2, 1939 |
| 2,994,175 | Williams | Aug. 1, 1961 |
| 3,010,268 | Freeman | Nov. 28, 1961 |